(12) United States Patent
Bi et al.

(10) Patent No.: US 11,030,178 B2
(45) Date of Patent: Jun. 8, 2021

(54) DATA STORAGE METHOD AND APPARATUS

(71) Applicant: Huawei Technologies Co., Ltd., Shenzhen (CN)

(72) Inventors: Jieshan Bi, Shenzhen (CN); Yijun Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 15/991,845

(22) Filed: May 29, 2018

(65) Prior Publication Data

US 2018/0276262 A1 Sep. 27, 2018

Related U.S. Application Data

(63) Continuation of application No. PCT/CN2016/095691, filed on Aug. 17, 2016.

(30) Foreign Application Priority Data

Jan. 29, 2016 (CN) .......................... 2016 1 0061190

(51) Int. Cl.
*G06F 16/22* (2019.01)
(52) U.S. Cl.
CPC ........ *G06F 16/2264* (2019.01); *G06F 16/221* (2019.01); *G06F 16/2272* (2019.01)
(58) Field of Classification Search
CPC . G06F 16/221; G06F 16/2264; G06F 16/2272
See application file for complete search history.

(56) References Cited

U.S. PATENT DOCUMENTS 5,757,900 A * 5/1998 Nagel ................. H04M 3/4228
379/221.09
6,546,394 B1 * 4/2003 Chong ................ G06F 16/2282
(Continued)

FOREIGN PATENT DOCUMENTS

CA 2921616 A1 3/2015
CN 1645372 A 7/2005
(Continued)

OTHER PUBLICATIONS

"The right column order in multi-column indexes," XP055508136, Jan. 8, 2016, 10 pages.
(Continued)

*Primary Examiner* — Ken Hoang
(74) *Attorney, Agent, or Firm* — Conley Rose, P.C.

(57) ABSTRACT

A data storage method and apparatus, where the method includes obtaining a primary index of a data object, where a row identifier of the primary index includes at least one field, determining a row identifier of a secondary index of the data object, where the row identifier of the secondary index includes an index field and a field other than the index field in the at least one field of the row identifier of the primary index, and the index field is different from the first field in the at least one field of the row identifier of the primary index, generating the secondary index of the data object according to the row identifier of the secondary index, and storing the data object according to the primary index and the secondary index, thereby saving storage space.

20 Claims, 4 Drawing Sheets

(56) References Cited

U.S. PATENT DOCUMENTS

| | | | |
|---|---|---|---|
| 7,263,536 B1* | 8/2007 | Pederson | ............ G06F 16/2228 |
| 8,719,225 B1 | 5/2014 | Rath | |
| 2003/0039362 A1* | 2/2003 | Califano | ............ G06F 21/6254 |
| | | | 380/283 |
| 2004/0088283 A1 | 5/2004 | Lissar et al. | |
| 2017/0132260 A1 | 5/2017 | Bi et al. | |

FOREIGN PATENT DOCUMENTS

| | | |
|---|---|---|
| CN | 101790257 A | 7/2010 |
| CN | 102609452 A | 7/2012 |
| CN | 103020204 A | 4/2013 |
| CN | 103703467 A | 4/2014 |
| CN | 104268272 A | 1/2015 |
| CN | 105354255 A | 2/2016 |
| CN | 105740405 A | 7/2016 |
| EP | 3236365 A1 | 10/2017 |
| WO | 2005022401 A1 | 3/2005 |

OTHER PUBLICATIONS

Schkolnick, M., et al., "Estimating the Cost of Updates in a Relational Database," XP058178728, ACM Transactions of Database Systems, vol. 10, No. 2, Jun. 1, 1985, pp. 163-179.

Mohan, C., et al., "Algorithms for Creating Indexes for Very Large Tables Without Quiescing Updates," XP058323301, Proceedings of the ACM SIGMOD International Conference on Management of Data, Jun. 2-5, 1992, pp. 361-370.

Foreign Communication From a Counterpart Application, European Application No. 16887578.9, Extended European Search Report dated Sep. 28, 2018, 10 pages.

Machine Translation and Abstract of Chinese Publication No. CN102609452, Jul. 25, 2012, 18 pages.

Machine Translation and Abstract of Chinese Publication No. CN103020204, Apr. 3, 2013, 13 pages.

Machine Translation and Abstract of Chinese Publication No. CN104268272, Jan. 7, 2015, 15 pages.

Foreign Communication From a Counterpart Application, Chinese Application No. 201610061190.7, Chinese Office Action dated Sep. 4, 2018, 5 pages.

Foreign Communication From a Counterpart Application, Chinese Application No. 201610061190.7, Search Report dated Aug. 25, 2018, 2 pages.

Machine Translation and Abstract of Chinese Publication No. CN1645372, Jul. 27, 2005, 9 pages.

Machine Translation and Abstract of Chinese Publication No. CN101790257, Jul. 28, 2010, 16 pages.

Machine Translation and Abstract of Chinese Publication No. CN105740405, Jul. 6, 2016, 17 pages.

Foreign Communication From a Counterpart Application, PCT Application No. PCT/CN2016/095691, English Translation of International Search Report dated Nov. 7, 2016, 2 pages.

* cited by examiner

DATA STORAGE METHOD AND APPARATUS

CROSS-REFERENCE TO RELATED APPLICATIONS

This application is a continuation of International Patent Application No. PCT/CN2016/095691 filed on Aug. 17, 2016, which claims priority to Chinese Patent Application No. 201610061190.7 filed on Jan. 29, 2016, both of which are hereby incorporated by reference in their entireties.

TECHNICAL FIELD

The present application relates to the field of information technologies, and in particular, to a data storage method and apparatus.

BACKGROUND

A distributed database means that multiple physically separated data storage units are combined together to constitute a logically unified database. In the distributed database, one user data table has one piece of primary-index data. Expected user data may be quickly found by performing query based on a rowkey of the primary-index data. If query is to be performed based on a condition of any column, a secondary index needs to be introduced such that the distributed database supports flexible query in more dimensions.

In other approaches, designs of secondary-index rowkeys are relatively similar, and are mostly creating a corresponding secondary index based on a primary index of a query column and the query column. In this case, there is a problem, where if the query column appears in both a primary-index rowkey and the secondary-index rowkey, the column is repeatedly stored, causing data redundancy.

SUMMARY

Embodiments of the present application provide a data storage method and apparatus such that storage space can be saved.

According to a first aspect, a data storage method is provided, including obtaining a primary index of a data object, where a row identifier of the primary index includes at least one field, determining a row identifier of a secondary index of the data object according to the row identifier of the primary index, where the row identifier of the secondary index includes an index field and a field other than the index field in the at least one field of the row identifier of the primary index, and the index field is different from the first field in the at least one field of the row identifier of the primary index, generating the secondary index of the data object according to the row identifier of the secondary index, and storing the data object according to the primary index and the secondary index.

According to the data storage method in the embodiments of the present application, the row identifier of the secondary index of the data object is determined according to the row identifier of the primary index, and the row identifier of the secondary index includes the index field and the field other than the index field in the at least one field of the row identifier of the primary index. This prevents the index field from being repeatedly stored such that data redundancy is reduced and storage space is saved.

With reference to the first aspect, in a first possible implementation, each of the at least one field is a column attribute of the data object, a random number, a constant, or processing on column data of the data object.

With reference to the first aspect or the first possible implementation of the first aspect, in a second possible implementation, when the at least one field of the row identifier of the primary index does not include the index field, the row identifier of the secondary index includes the index field and all fields in the at least one field of the row identifier of the primary index.

Herein, when the row identifier of the primary index does not include the index field, the row identifier of the secondary index includes the index field and all the fields in the row identifier of the primary index.

With reference to any one of the possible implementations of the first aspect, in a third possible implementation, the method further includes receiving a data query request, where the data query request instructs to query data in the data object according to a value of the index field, querying the secondary index of the data object according to the value of the index field, to determine a secondary-index row identifier value corresponding to the data in the data object, determining, according to the secondary-index row identifier value, a primary-index row identifier value corresponding to the data in the data object, and obtaining the data in the data object according to the primary-index row identifier value.

With reference to the third possible implementation of the first aspect, determining, according to the secondary-index row identifier value, a primary-index row identifier value corresponding to the data in the data object includes restructuring the secondary-index row identifier value to obtain the primary-index row identifier value when the at least one field of the row identifier of the primary index includes the index field, or removing the value of the index field from the secondary-index row identifier value to obtain the primary-index row identifier value when the at least one field of the row identifier of the primary index does not include the index field.

According to a second aspect, a data storage apparatus is provided configured to execute the method according to any one of the first aspect or the possible implementations of the first aspect. Further, the apparatus includes units configured to execute the method according to any one of the first aspect or the possible implementations of the first aspect.

According to a third aspect, a data storage apparatus is provided, where the apparatus includes a receiver, a transmitter, a memory, a processor, and a bus system. The receiver, the transmitter, the memory, and the processor are connected using the bus system. The memory is configured to store an instruction. The processor is configured to execute the instruction stored in the memory to control the receiver to receive a signal and control the transmitter to send a signal. In addition, when the processor executes the instruction stored in the memory, the execution enables the processor to execute the method according to any one of the first aspect or the possible implementations of the first aspect.

According to a fourth aspect, a computer readable medium is provided configured to store a computer program, where the computer program includes an instruction used to execute the method according to any one of the first aspect or the possible implementations of the first aspect.

According to a fifth aspect, a database system is provided, where the database system includes the data storage apparatus according to the second aspect or the third aspect and a database.

BRIEF DESCRIPTION OF DRAWINGS

To describe the technical solutions in the embodiments of the present application more clearly, the following briefly describes the accompanying drawings required for describing the embodiments of the present application. The accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application.

Figure 1:
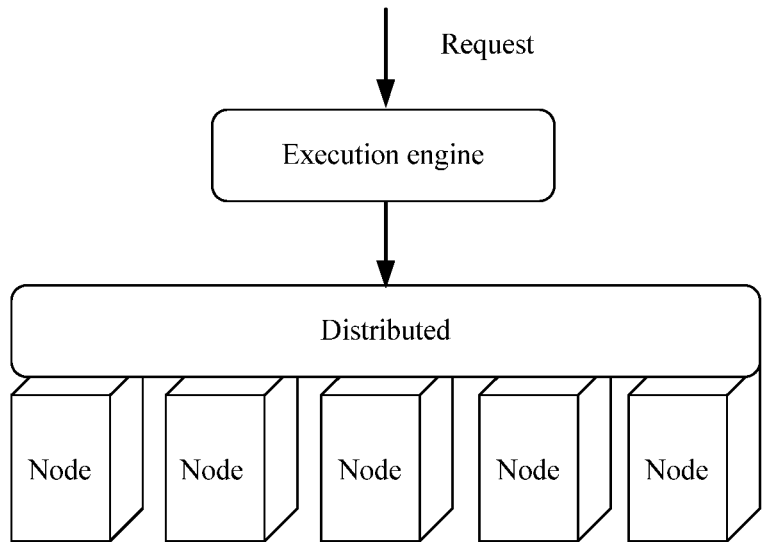
FIG. 1 is a schematic diagram of a distributed database system according to an embodiment of the present application.

The technical solutions in the embodiments of the present application may be applied to a database system, such as a distributed database system. FIG. 1 is a schematic diagram of a distributed database system. As shown in FIG. 1, data is stored on multiple nodes in a distributed manner, and an execution engine (which is also referred to as a storage engine) stores and queries data according to a request of a client.

In this embodiment of the present application, a data object is a data table (which may also be briefly referred to as a "table") or a type of data in a format of a data table. For example, the type of data may be call record data, Internet access record data, or the like. For ease of description, a data table is used as an example for description in the following embodiments.

Figure 2:
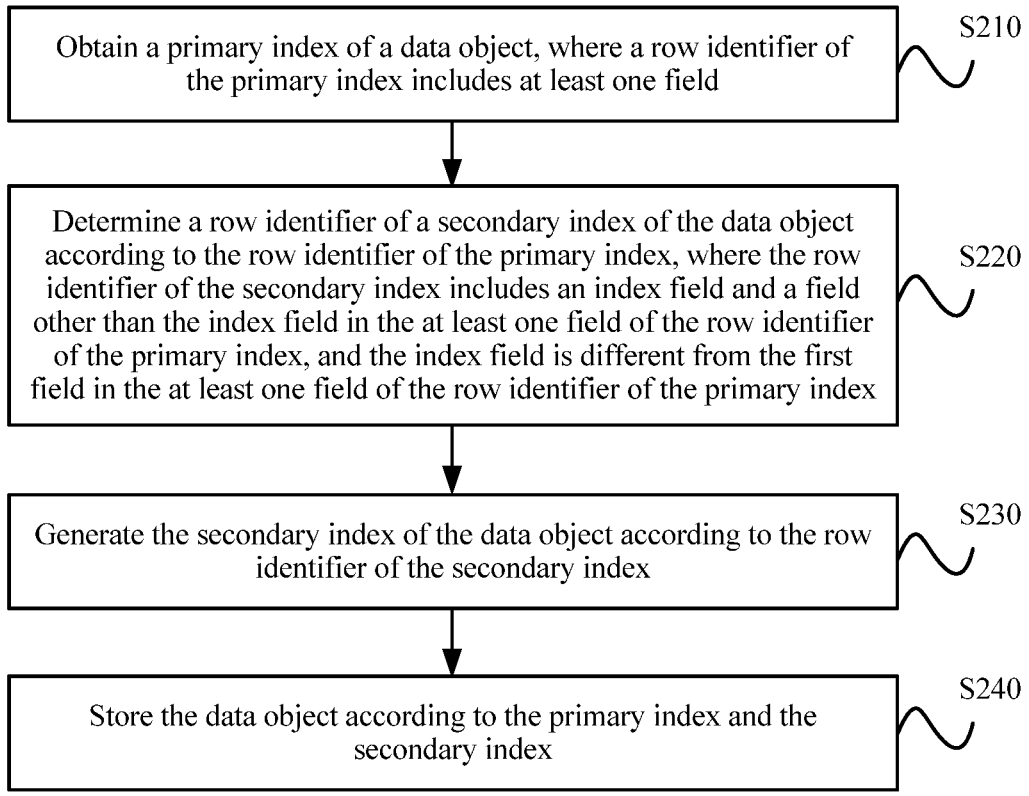
FIG. 2 is a schematic flowchart of a data storage method according to an embodiment of the present application.

FIG. 2 is a schematic flowchart of a data storage method 200 according to an embodiment of the present application. The method in FIG. 2 is executed by a data storage apparatus. The data storage apparatus may be a database system, or may be an execution engine in a database system. As shown in FIG. 2, the method 200 includes the following steps.

Step S210. Obtain a primary index of a data object, where a row identifier of the primary index includes at least one field.

Step S220. Determine a row identifier of a secondary index of the data object according to the row identifier of the primary index, where the row identifier of the secondary index includes an index field and a field other than the index field in the at least one field of the row identifier of the primary index, and the index field is different from the first field in the at least one field of the row identifier of the primary index.

Step S230. Generate the secondary index of the data object according to the row identifier of the secondary index.

Step S240. Store the data object according to the primary index and the secondary index.

The data storage apparatus obtains the primary index of the data object, where the row identifier (such as a rowkey) of the primary index includes the at least one field, then determines the row identifier of the secondary index of the data object according to the row identifier of the primary index, where the row identifier of the secondary index includes the index field and the field other than the index field in the at least one field of the row identifier of the primary index, and the index field is different from the first field in the at least one field of the row identifier of the primary index, then generates the corresponding secondary index according to the row identifier of the secondary index, and finally, stores the data object according to the primary index and the secondary index.

In this embodiment of the present application, the row identifier of the primary index and the row identifier of the secondary index each are a row identifier that is defined, or obtained by means of division, based on a section. A section corresponds to a field. According to the section-based row identifier definition, a constant, a random number, and a result of function processing on a field value may be added to the row identifier in order to flexibly meet use by an application layer.

For example, the row identifier of the primary index includes section 1+section 2+section 3, and the index field is section 2. In this case, the row identifier of the secondary index needs to be created based on the index field section 2, and section 2 and the row identifier of the primary index need to be saved in the identifier of the secondary index. Because section 2 already exists in the row identifier of the primary index, according to the technical solution of the present application, the row identifier of the secondary index only needs to include section 2+section 1+section 3 in order to avoid repeated storage. Therefore, according to the section-based definition method in the present application, the index field can be prevented from being repeatedly stored in order to achieve an objective of reducing data redundancy.

Optionally, in this embodiment of the present application, when the at least one field of the row identifier of the primary index does not include the index field, the row identifier of the secondary index includes the index field and all fields in the at least one field of the row identifier of the primary index.

For another example, the row identifier of the primary index includes section 1+section 2+section 3, and the index field is section 4. In this case, the row identifier of the secondary index needs to be created based on the index field section 4, and section 4 and the row identifier of the primary index need to be saved in the identifier of the secondary index, that is, the row identifier of the secondary index includes section 4+section 1+section 2+section 3.

That is, when a rowkey field of the primary index and a rowkey field of the secondary index do not include a duplicated field, the row identifier of the secondary index of the data object may be determined using a row identifier that is defined based on a section in the present application.

In this embodiment of the present application, the primary index of the data object may be written or directly obtained using the data storage apparatus. For example, for a data object that has existed in a database, a primary index of the data object may be directly obtained, for a data object that is not written into a database, a primary index may be obtained by defining a row identifier of the primary index of the data object based on a section.

Therefore, according to the data storage method in this embodiment of the present application, the row identifier of the secondary index of the data object is determined according to the row identifier of the primary index, and the row identifier of the secondary index includes the index field and the field other than the index field in the at least one field of the row identifier of the primary index. This prevents the index field from being repeatedly stored such that data redundancy is reduced and storage space is saved.

It should be understood that in this embodiment of the present application, the row identifier is an identifier of data in each row. The row identifier may be expressed as a rowkey, or may be expressed as a key. This is not limited in the present application. For ease of description, a rowkey is used as an example for description in the following embodiments.

Optionally, in this embodiment of the present application, each of the at least one field is a column attribute of the data object, a random number, a constant, or processing on column data of the data object.

Further, a primary-index rowkey and a secondary-index rowkey each include a section. Each section is generally a user data column, that is, a column attribute corresponding to data in the data object, may be a constant or a random number (or an enumerated value), or may be function processing (for example, substring) on a user data column. In addition, a length of each section is not limited herein.

Figure 3:
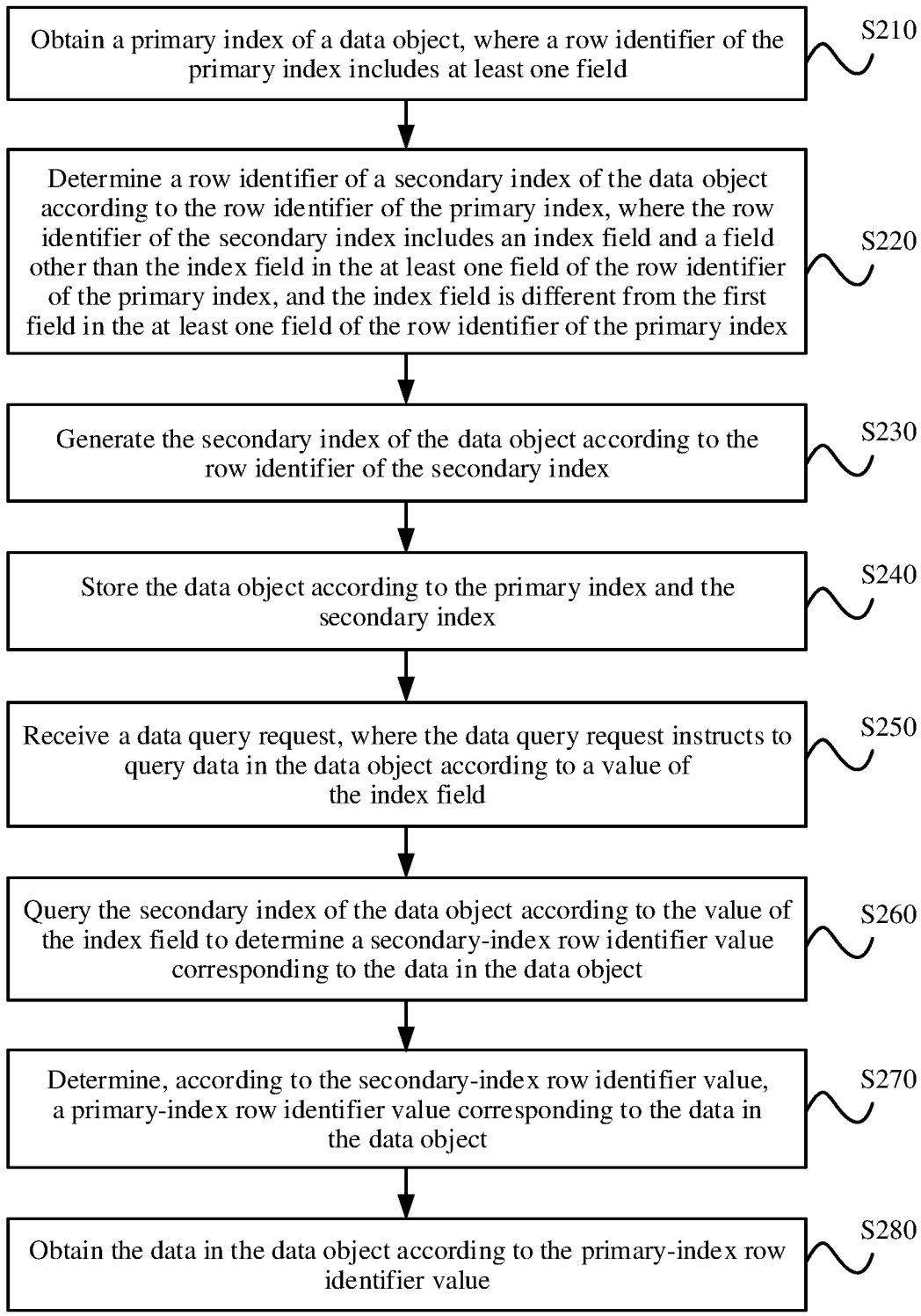
FIG. 3 is a schematic flowchart of a data storage method according to another embodiment of the present application.

Optionally, as shown in FIG. 3, in an embodiment, the method 200 may further include the following steps.

Step S250. Receive a data query request, where the data query request instructs to query data in the data object according to a value of the index field.

Step S260. Query the secondary index of the data object according to the value of the index field to determine a secondary-index row identifier value corresponding to the data in the data object.

Step S270. Determine, according to the secondary-index row identifier value, a primary-index row identifier value corresponding to the data in the data object.

Step S280. Obtain the data in the data object according to the primary-index row identifier value.

The data storage apparatus receives the data query request of a client, where the data query request instructs to query the data in the data object according to the value of the index field, then queries the secondary index of the data object according to the value of the index field, and determines the secondary-index row identifier value corresponding to the data in the data object, then determines, according to the secondary-index row identifier value, the primary-index row identifier value corresponding to the data in the data object, and finally, obtains the data in the data object according to the primary-index row identifier value in order to complete a process of querying the data using a generated index table.

Optionally, in step S270, determining, according to the secondary-index row identifier value, a primary-index row identifier value corresponding to the data in the data object includes restructuring the secondary-index row identifier value to obtain the primary-index row identifier value when the at least one field of the row identifier of the primary index includes the index field, or removing the value of the index field from the secondary-index row identifier value to obtain the primary-index row identifier value when the at least one field of the row identifier of the primary index does not include the index field.

Herein, determining, according to the secondary-index row identifier value, a primary-index row identifier value corresponding to the data in the data object may include the following cases.

When the field of the row identifier of the primary index includes the index field, the secondary-index row identifier value is restructured to obtain the primary-index row identifier value, or when the field of the row identifier of the primary index does not include the index field, the primary-index row identifier value is a value obtained by removing the value of the index field from the secondary-index row identifier value.

That is, for a query phase, regardless of whether the field of the row identifier of the primary index includes the index field, the primary-index row identifier value can be determined according to the method in the present application in order to complete a query process.

Therefore, according to the data storage method in this embodiment of the present application, the row identifier of the secondary index of the data object is determined according to the row identifier of the primary index, and the row identifier of the secondary index includes the index field and the field other than the index field in the at least one field of the row identifier of the primary index. This prevents the index field from being repeatedly stored such that data redundancy is reduced and storage space is saved.

The following describes this embodiment of the present application in detail with reference to a specific example. It should be noted that the example herein is merely intended to help a person skilled in the art better understand this embodiment of the present application, rather than to limit the scope of this embodiment of the present application.

For example, it is assumed that there is a user table (or a data object). As shown in Table 1, the user table includes five fields, ID, name, address, phone, and date. There are mainly four scenarios of querying the user table, query by ID, query by name, query by ID+name, and query by ID+name+date. In the following three scenarios, a value corresponding to an index field can be obtained by directly querying the table using the ID, query by ID, query by ID+name, and query by ID+name+date. However, in the scenario of query by name, a value of an index field cannot be directly obtained. For query by name, a primary index and a secondary index need to be created. The following uses the section-based method in the present application to design a scenario in which a primary-index rowkey and a secondary-index rowkey are queried using the name field.

TABLE 1

| ID | Name | Date | Address | Phone |
|---|---|---|---|---|
| A0000001 | Zhang | 20150623 | Shenzhen, Guangdong | 18600001111 |
| A0000002 | Li | 20150623 | Shenzhen, Guangdong | 18600001112 |
| A0000003 | Guo | 20150624 | Sichuan | 18600011111 |
| A0000004 | Bi | 20150624 | Shandong | 18600011112 |
| A0000005 | Wu | 20150624 | Zhuhai | 18600011113 |
| ... | ... | ... | ... | ... |
| A0000111 | Zhong | 20150624 | Guangdong | 18600055555 |

The primary-index rowkey includes three sections (e.g. section 1, section 2, section 3). Herein, section 1 is an ID, section 2 is a name, and section 3 is truncate (Date, 8), which is a function that truncates the first eight digits of a date. That is, a section-based structure corresponding to the primary-index rowkey is (ID, name, truncate (Date, 8)).

Because the section of the name field (a column attribute) already exists in the primary index, a structure of the secondary-index rowkey of the name field is (name, ID, truncate (Date, 8)). The ID and truncate (Date, 8) in the secondary-index rowkey are original sections in the primary-index rowkey. Herein, only one section corresponding to the name needs to be saved such that repeated storage is avoided. Then, the corresponding secondary index is generated according to the secondary-index rowkey, and user data is stored according to the primary index and the secondary index.

Optionally, for already existing user data, a primary index of the user data may be read, and then a secondary-index rowkey is restructured according to the section-based definition method, and is written into a secondary-index table. For example, it is assumed that two pieces of data are read. As shown in Table 2, primary-index data and a primary-index column are read. A secondary-index rowkey in Table 3 is newly generated according to the read primary-index rowkey, and then a corresponding secondary index is generated according to the secondary-index rowkey, and the user data is stored according to the primary index and the secondary index.

TABLE 2

| Primary-index data rowkey | | | Primary-index column | |
|---|---|---|---|---|
| ID | Name | Truncate (Date, 8) | Address | Phone |
| A0000001 | Zhang | 20150623 | Shenzhen | 18600001111 |
| A0000002 | Li | 20150623 | Foshan | 18600001112 |

TABLE 3

| Secondary-index rowkey | | |
|---|---|---|
| Name | ID | Truncate (Date, 8) |
| Zhang | A0000001 | 20150623 |
| Li | A0000002 | 20150623 |

Optionally, after the user data is stored according to the primary index and the secondary index, the user data may be queried using the primary index and the secondary index.

For example, when a query statement in a received data query request is: select * from UserInfo where name='Li', the query statement instructs to query data of "Li" according to a value of the name field. In this case, a corresponding query process is as follows.

First, the secondary index in the user data is queried according to the value "Li" of the name field, and row data of "Li" is located in order to determine that a secondary-index rowkey value corresponding to the data in the user data is "Li+A00000002+20150623" in Table 3.

Next, it is determined, according to information about the secondary-index rowkey value "Li+A00000002+20150623", that a primary-index rowkey value is "A00000002+Li+20150623" in Table 2.

Finally, the corresponding row data is located using the primary-index rowkey value, and all data is obtained, and is returned to a client.

For another example, with reference to Table 1, in a scenario of query by phone, a primary index is ID+name+date, that is, when a field of a row identifier of the primary index does not include an index field phone, the technical solution in the present application may also be applied.

Further, a secondary index that uses phone as the index field is created based on the section-based method in the present application. In this case, in the phone query scenario, corresponding sections of a secondary-index rowkey include (phone, ID, name, truncate (Date, 8)). A structure of a primary-index rowkey is still (ID, name, truncate (Date, 8)). Herein, the field of the primary-index rowkey and the field of the secondary-index rowkey do not include a duplicated field, and therefore, all the three sections of the primary-index rowkey are saved in the secondary-index rowkey. Next, the secondary index is obtained according to the secondary-index rowkey in order to perform a subsequent query or storage operation. That is, a primary-index rowkey value may be obtained by removing a value of the index field phone from a secondary-index rowkey value. Therefore, the section-based solution of designing the secondary-index rowkey in the present application may still be used to perform function processing on the field.

Optionally, in the scenario of query by phone, a procedure for storing data and querying data is similar to a processing procedure in the scenario of query by name. For brevity, details are not repeated herein.

In this embodiment of the present application, the section-based secondary index defining method may be used not only when the primary index and the secondary index include a same index field, but also when the primary index and the secondary index do not include a same field. In this way, it is convenient for a user to perform query, and more abundant query scenarios are provided such that data query efficiency can be improved.

Therefore, according to the data storage method in this embodiment of the present application, the row identifier of the secondary index of the data object is determined according to the row identifier of the primary index, and the row identifier of the secondary index includes the index field and the field other than the index field in the at least one field of the row identifier of the primary index. This prevents the index field from being repeatedly stored such that data redundancy is reduced and storage space is saved.

It should be understood that the truncate function in this embodiment of the present application may alternatively be another processing function. This is not limited in the present application.

The foregoing has described in detail the data storage method according to this embodiment of the present application. The following describes a data storage apparatus according to an embodiment of the present application.

Figure 4:
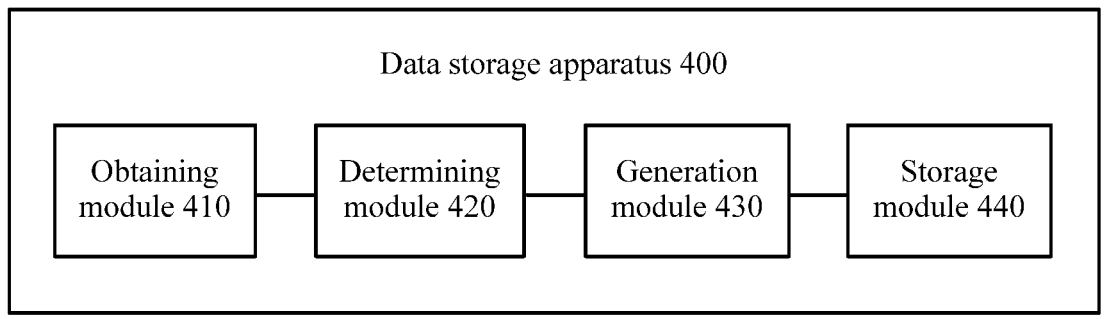
FIG. 4 is a schematic block diagram of a data storage apparatus according to an embodiment of the present application.

FIG. 4 is a schematic block diagram of a data storage apparatus 400 according to an embodiment of the present application. As shown in FIG. 4, the apparatus 400 includes an obtaining module 410 configured to obtain a primary index of a data object, where a row identifier of the primary index includes at least one field, a determining module 420 configured to determine a row identifier of a secondary index of the data object according to the row identifier of the primary index, where the row identifier of the secondary index includes an index field and a field other than the index field in the at least one field of the row identifier of the primary index, and the index field is different from the first field in the at least one field of the row identifier of the primary index, a generation module 430 configured to generate the secondary index of the data object according to the row identifier that is of the secondary index and that is determined by the determining module 420, and a storage module 440 configured to store the data object according to the primary index and the secondary index that is generated by the generation module 430.

In this embodiment of the present application, optionally, each of the at least one field is a column attribute of the data object, a random number, a constant, or processing on column data of the data object.

In this embodiment of the present application, optionally, when the at least one field of the row identifier of the primary index does not include the index field, the row identifier of the secondary index includes the index field and all fields in the at least one field of the row identifier of the primary index.

Figure 5:
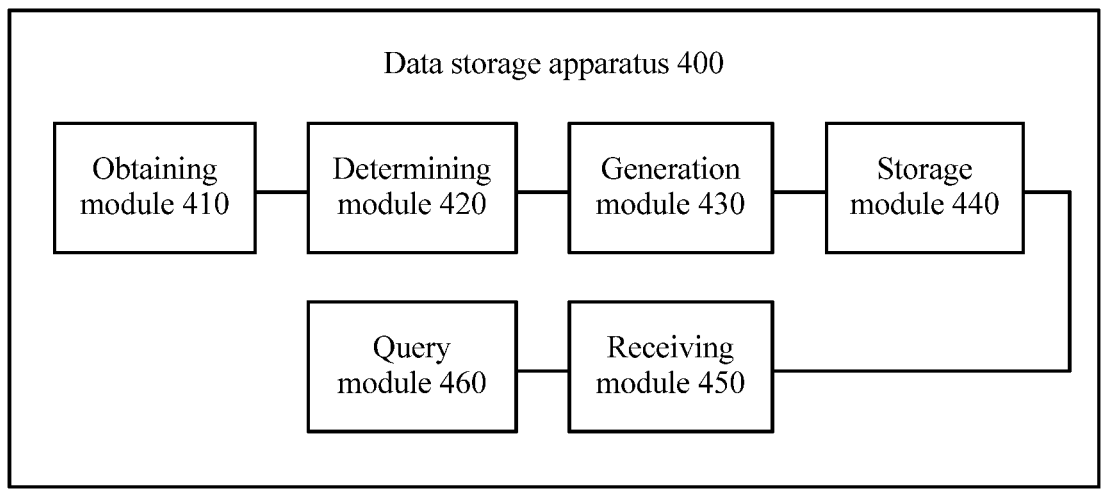
FIG. 5 is a schematic block diagram of a data storage apparatus according to another embodiment of the present application.

In this embodiment of the present application, optionally, as shown in FIG. 5, the apparatus 400 may further include a receiving module 450 configured to receive a data query request, where the data query request instructs to query data in the data object according to a value of the index field, and a query module 460 configured to query the secondary index of the data object according to the value of the index field, to determine a secondary-index row identifier value corresponding to the data in the data object.

The determining module 420 is further configured to determine, according to the secondary-index row identifier value determined by the query module 460, a primary-index row identifier value corresponding to the data in the data object.

The obtaining module 410 is further configured to obtain the data in the data object according to the primary-index row identifier value.

Optionally, the determining module 420 is further configured to regroup the secondary-index row identifier value to obtain the primary-index row identifier value when the at least one field of the row identifier of the primary index includes the index field, or remove the value of the index field from the secondary-index row identifier value to obtain the primary-index row identifier value when the at least one field of the row identifier of the primary index does not include the index field.

The data storage apparatus 400 according to this embodiment of the present application may be corresponding to an execution body of the method according to the embodiments of the present application, and the foregoing and other operations and/or functions of the modules in the data storage apparatus 400 are respectively used to implement corresponding procedures of the foregoing methods. For brevity, details are not described herein again.

According to the data storage apparatus in this embodiment of the present application, the row identifier of the secondary index of the data object is determined according to the row identifier of the primary index, and the row identifier of the secondary index includes the index field and the field other than the index field in the at least one field of the row identifier of the primary index. In this way, data redundancy is reduced, and storage space is saved.

Figure 6:
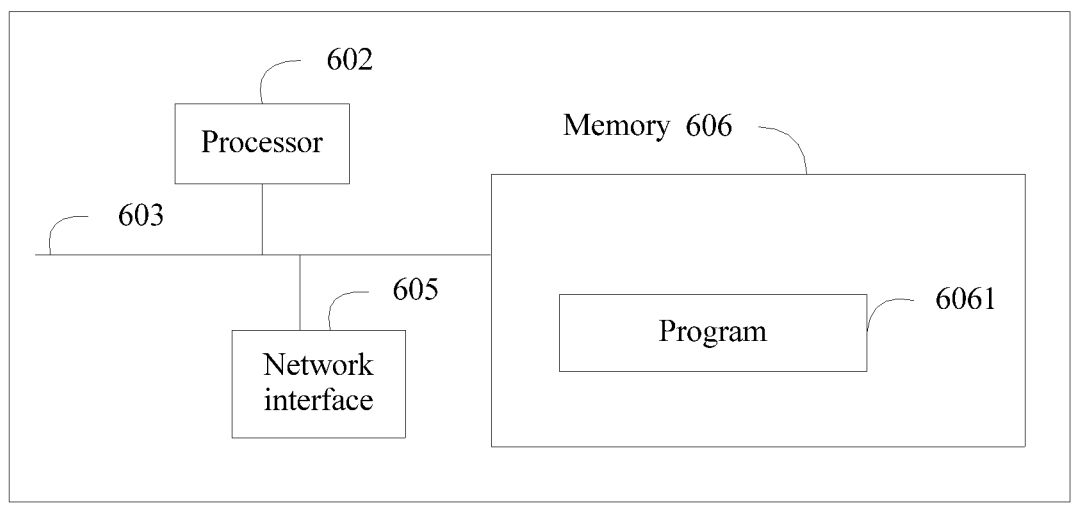
FIG. 6 is a schematic structural diagram of a data storage apparatus according to an embodiment of the present application.

FIG. 6 shows a structure of a data storage apparatus according to another embodiment of the present application. The data storage apparatus includes at least one processor 602 (for example, a central processing unit (CPU)), at least one network interface 605 or another communications interface, a memory 606, and at least one communications bus 603 that is configured to implement connection and communication among these apparatuses. The processor 602 is configured to execute an executable module stored in the memory 606, for example, a computer program. The memory 606 may include a high-speed random access memory (RAM), and may also include a non-volatile memory, for example, at least one magnetic disk memory. Communication and connection between the memory 606 and at least one other network element are implemented using the at least one network interface 605 (which may be wired or wireless).

In some implementations, the memory 606 stores a program 6061. The program 6061 may be executed by the processor 602. The program 6061 includes obtaining a primary index of a data object, where a row identifier of the primary index includes at least one field, determining a row identifier of a secondary index of the data object according to the row identifier of the primary index, where the row identifier of the secondary index includes an index field and a field other than the index field in the at least one field of the row identifier of the primary index, and the index field is different from the first field in the at least one field of the row identifier of the primary index, generating the secondary index of the data object according to the row identifier of the secondary index, and storing the data object according to the primary index and the secondary index.

Optionally, each of the at least one field is a column attribute of the data object, a random number, a constant, or processing on column data of the data object.

Optionally, when the at least one field of the row identifier of the primary index does not include the index field, the row identifier of the secondary index includes the index field and all fields in the at least one field of the row identifier of the primary index.

Optionally, the program 6061 further includes receiving a data query request, where the data query request instructs to query data in the data object according to a value of the index field, querying the secondary index of the data object according to the value of the index field, to determine a secondary-index row identifier value corresponding to the data in the data object, determining, according to the secondary-index row identifier value, a primary-index row identifier value corresponding to the data in the data object, and obtaining the data in the data object according to the primary-index row identifier value.

Optionally, determining, according to the secondary-index row identifier value, a primary-index row identifier value corresponding to the data in the data object includes restructuring the secondary-index row identifier value to obtain the primary-index row identifier value when the at least one field of the row identifier of the primary index includes the index field, or removing the value of the index field from the secondary-index row identifier value to obtain the primary-index row identifier value when the at least one field of the row identifier of the primary index does not include the index field.

It can be learned from the foregoing technical solution provided in this embodiment of the present application that, according to this embodiment of the present application, the row identifier of the secondary index of the data object is determined according to the row identifier of the primary index, and the row identifier of the secondary index includes the index field and the field other than the index field in the at least one field of the row identifier of the primary index. This prevents the index field from being repeatedly stored such that data redundancy is reduced and storage space is saved.

It should be understood that, the term "and/or" in this specification describes only an association relationship for describing associated objects and represents that three relationships may exist. For example, A and/or B may represent the following three cases, only A exists, both A and B exist, and only B exists. In addition, the character "/" in this specification generally represents an "or" relationship between the associated objects.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

A person of ordinary skill in the art may be aware that the units and algorithm steps in the examples described with reference to the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for convenience and brevity of description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electronic, mechanical, or other forms.

The units described as separate parts may or may not be physically separate, and parts displayed as units may or may not be physical units, and may be located in one position or distributed on a plurality of network units. Some or all of the units may be selected according to actual requirements to achieve the objectives of the solutions of the embodiments.

In addition, function units in the embodiments of the present application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the present application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes any medium that can store program code, such as a universal serial bus (USB) flash drive, a removable hard disk, a read-only memory (ROM), a RAM, a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A data storage method, comprising:
obtaining a primary index of a data object, wherein each row identifier of the primary index comprises a first field, a second field, a third field, a fourth field, and a fifth field, and wherein the first field comprises a first index field for the primary index;
generating a secondary index of the data object according to the row identifier of the primary index, wherein each row identifier of the secondary index comprises the first field, the second field, and the third field, wherein the second field comprises a second index field for the secondary index, wherein the first index field and the second index field are different, and wherein each row identifier of the secondary index does not comprise the fourth field and the fifth field; and
storing the data object according to the primary index and the secondary index.

2. The data storage method of claim 1, wherein the first field comprises a column attribute of the data object, a random number, a constant, or processing on column data of the data object.

3. The data storage method of claim 1, wherein the first field for the primary index of the data object comprises an identification number, and wherein the second field for the secondary index of the data object comprises a name.

4. The data storage method of claim 1, further comprising:
receiving a data query request instructing to query data in the data object according to a value of the second index field;
querying the secondary index of the data object according to the value of the second index field to determine a secondary-index row identifier value corresponding to the data in the data object;
determining, according to the secondary-index row identifier value, a primary-index row identifier value corresponding to the data in the data object; and
obtaining the data in the data object according to the primary-index row identifier value.

5. The data storage method of claim 4, wherein determining the primary-index row identifier value corresponding to the data in the data object comprises:
restructuring the secondary-index row identifier value to obtain the primary-index row identifier value when the first field of the row identifier of the primary index comprises the first index field; and
removing the value of the second index field from the secondary-index row identifier value to obtain the primary-index row identifier value.

6. The data storage method of claim 1, wherein the first field comprises a identification number, wherein the second field comprises a last name, wherein the third field comprises a date, wherein the fourth field comprises an address, and wherein the fifth field comprises a phone number.

7. The data storage method of claim 6, wherein each row identifier of the secondary index only comprises the identification number, the last name, and the date, and wherein each row identifier of the secondary index does not comprise the address and the phone number.

8. A data storage apparatus, comprising:
a processor; and
a non-transitory computer-readable storage medium coupled to the processor and storing instructions for execution by the processor, wherein the instructions cause the processor to be configured to:
obtain a primary index of a data object, wherein each row identifier of the primary index comprises a first field, a second field, a third field, a fourth field, and a fifth field, and wherein the first field comprises a first index field for the primary index;
generate a secondary index of the data object according to the row identifier of the primary index, wherein each row identifier of the secondary index comprises the first field, the second field, and the third field, wherein the second field comprises a second index field for the secondary index, wherein the first index field and the second index field are different, and wherein each row identifier of the secondary index does not comprise the fourth field and the fifth field; and
store the data object according to the primary index and the secondary index.

9. The data storage apparatus of claim 8, wherein the first field comprises a column attribute of the data object, a random number, a constant, or processing on column data of the data object.

10. The data storage apparatus of claim 8, wherein the first field for the primary index of the data object comprises an identification number, and wherein the second field for the secondary index of the data object comprises a name.

11. The data storage apparatus of claim 8, wherein the instructions further cause the processor to be configured to:
receive a data query request instructing to query data in the data object according to a value of the second index field;
query the secondary index of the data object according to the value of the second index field to determine a secondary-index row identifier value corresponding to the data in the data object;
determine, according to the secondary-index row identifier value, a primary-index row identifier value corresponding to the data in the data object; and
obtain the data in the data object according to the primary-index row identifier value.

12. The data storage apparatus of claim 11, wherein the instructions further cause the processor to be configured to:
restructure the secondary-index row identifier value to obtain the primary-index row identifier value when the first field of the row identifier of the primary index comprises the first index field; and
remove the value of the second index field from the secondary-index row identifier value to obtain the primary-index row identifier value.

13. A computer program product comprising a non-transitory computer-readable medium storing instructions that when executed by a processor, cause the processor to be configured to:
obtain a primary index of a data object, wherein each row identifier of the primary index comprises a first field, a second field, a third field, a fourth field, and a fifth field, and wherein the first field comprises a first index field for the primary index;
generate a secondary index of the data object according to the according to the row identifier of the primary index, wherein each row identifier of the secondary index comprises the first field, the second field, and the third field, wherein the second field comprises a second index field for the secondary index, wherein the first index field and the second index field are different, and wherein each row identifier of the secondary index does not comprise the fourth field and the fifth field; and
store the data object according to the primary index and the secondary index.

14. The computer program product of claim 13, wherein the first field comprises a column attribute of the data object.

15. The computer program product of claim 13, wherein at least one of the first field, the second field, or the third field comprises a random number.

16. The computer program product of claim 13, wherein at least one of the first field, the second field, or the third field comprises a constant.

17. The computer program product of claim 13, wherein at least one of the first field, the second field, or the third field comprises processing on column data of the data object.

18. The computer program product of claim 13, wherein the first field for the primary index of the data object comprises an identification number, and wherein the second field for the secondary index of the data object comprises a name.

19. The computer program product of claim 13, wherein the instructions further cause the processor to be configured to:
receive a data query request instructing to query data in the data object according to a value of the second index field;
query the secondary index of the data object according to the value of the second index field to determine a secondary-index row identifier value corresponding to the data in the data object;
determine, according to the secondary-index row identifier value, a primary-index row identifier value corresponding to the data in the data object; and
obtain the data in the data object according to the primary-index row identifier value.

20. The computer program product of claim 19, wherein the instructions further cause the processor to be configured to:
restructure the secondary-index row identifier value to obtain the primary-index row identifier value when the first field of the row identifier of the primary index comprises the first index field; and
remove the value of the second index field from the secondary-index row identifier value to obtain the primary-index row identifier value.

* * * * *